United States Patent [19]

Watanabe et al.

[11] Patent Number: 4,634,139
[45] Date of Patent: Jan. 6, 1987

[54] REAR FORK OF MOTORCYCLE

[75] Inventors: Kazuo Watanabe, Niiza; Hajime Shougase; Akio Umeoka, both of Asaka, all of Japan

[73] Assignee: Honda Giken Kogyo Kabushiki Kaisha, Tokyo, Japan

[21] Appl. No.: 770,473

[22] Filed: Aug. 29, 1985

[30] Foreign Application Priority Data

Sep. 4, 1984 [JP] Japan .................................. 59-183835
Sep. 4, 1984 [JP] Japan .................................. 59-183836

[51] Int. Cl.$^4$ ............................................. B62K 19/30
[52] U.S. Cl. ...................................... 280/288; 180/231
[58] Field of Search ................. 280/284, 288; 180/219, 180/231, 227; 474/101, 116

[56] References Cited

U.S. PATENT DOCUMENTS

| 474,327 | 5/1892 | Meigs et al. | 280/288 X |
| 571,941 | 11/1896 | Bolte | 280/288 |
| 4,524,989 | 6/1985 | Ceteny | 280/288 X |
| 4,540,193 | 9/1985 | Noda et al. | 280/284 |

FOREIGN PATENT DOCUMENTS 157459 11/1939 Fed. Rep. of Germany ...... 280/284
312494 12/1955 Switzerland ........................ 280/284

Primary Examiner—John J. Love
Assistant Examiner—Charles R. Watts
Attorney, Agent, or Firm—Armstrong, Nikaido, Marmelstein & Kubovcik

[57] ABSTRACT

A thin U-shaped rear axle guide plate made of steel is detachably attached along rear end portions of rear fork arms made of light alloy and formed in a bifurcate shape. This rear axle guide plate is made longer at its lower branch portion than its upper branch portion, and a free end portion of its lower branch portion includes a projection projecting upward. The rear fork arms are provided at side surfaces opposite to the rear axle guide plate with a retaining pin projecting therefrom. Engaged with this retaining pin is a cam face of a drive chain tension adjusting plate pivotably supported by the rear axle. The adjusting plate is pressed and held by a nut which is in threaded engagement with the retaining pin. The adjusting plate may be formed with an annular rib around an opening in which the rear axle penetrates, and this annular rib may be engaged with step portions formed at the rear fork arms.

3 Claims, 7 Drawing Figures

REAR FORK OF MOTORCYCLE

BACKGROUND OF THE INVENTION

This invention relates to a rear fork of a motorcycle, and more particularly to a rear fork of the type that a rear end portion of a pair of rear fork arms is formed in a bifurcate shape for supporting a rear axle.

Generally, a rear wheel of a motorcycle is supported by a rear end portion of a rear fork oscillatably attached to a vehicle body frame. The rear fork has a pair of right and left rear fork arms. A rear end portion of each of the rear fork arms is formed in a bifurcate shape in order to easily attach and detach the rear wheel. The rear axle is disposed in this bifurcated portion and supported.

A drive chain tension adjusting plate is pivotably supported on the rear axle. This adjusting plate is a cam plate having a spiral-shaped profile (cam face). On the other hand, a pin is projected from a front location of the bifurcated portion of the rear fork arms. The cam face of the adjusting plate engages the pin. Accordingly, when the adjusting plate is pivoted around the rear axle, depending on the pivoting directions, the rear axle is moved rearward or forward along the bifurcated portion of the rear fork arms. Such rearward or forward movement of the rear axle causes a drive chain stretched between an output shaft of an engine and the rear wheel to get tensioned and loosened. Accordingly, by setting the adjusting plate in an appropriate angular position, tension degree of the drive chain can be properly adjusted.

However, the above-mentioned conventional rear fork includes several problems when the rear fork is going to be made of light alloy in order to reduce its weight. That is, since the bifurcated portion serves to transmit weight of the vehicle body to the rear axle and to transmit the reaction force received from the ground to the vehicle body through the rear axle, the bifurcated portion requires a sufficient strength. If this portion is to be made of light alloy, it is necessarily required to make the wall of this portion thick. As a result, the intended light weight effect to be obtained by using the light alloy material is offset or diminished. In addition, the rear fork is required to be made large in its size, and molding thereof becomes difficult. The pin is required to be made of highly strong materials such as steel in order to bear the tensile force of the chain. However, these materials are difficult to weld to a light alloy material such as aluminum.

In order to detach the rear wheel from the rear fork in order to repair a flat tire, etc., the rear axle is required to be pulled off from the rear wheel and the rear fork arms. At this time, the drive chain tension adjusting plate loses its support and drops. Accordingly, after the rear wheel and the adjusting plate are reattached to the rear fork, the adjusting plate is required to be readjusted. This is particularly disadvantageous when a prompt work is required as in the case of an off-road endurance race, or the like.

SUMMARY OF THE INVENTION

It is therefore an object of the present invention to provide a rear fork which can be made light in weight and is easy to manufacture.

Another object of the invention is to provide a lightweight rear fork, wherein the rear fork main body is formed of light alloy.

A further object of the invention is to provide a rear fork, wherein the rear wheel can be easily attached and detached.

A still further object of the invention is to provide a rear fork, in which a drive chain tension adjusting plate is not required to be readjusted.

An even further object of the invention is to provide a rear fork, in which a pin for engaging the drive chain adjusting plate is prevented from getting loosened.

In a rear fork of a motorcycle according to the present invention, a rear end portion of a pair of right and left rear fork arms is formed in a simple bifurcate shape. A U-shaped rear axle guide plate adapted to support and guide the rear axle is detachably attached along a side surface of the rear end portion. This rear axle guide plate has a longer lower branch portion than an upper branch portion, and a free end portion of the lower branch portion includes a projection projecting upward therefrom. The bifurcated portion of the rear end of the rear fork arms does not directly support the rear axle. Accordingly, the bifurcated portion can be made simple in shape, and an easy forging of the rear fork main body can be obtained. The rear axle guide plate can be formed of a thin steel plate. Accordingly, attachment of this rear axle guide plate to the rear fork main body made of light alloy enables formation of the rear fork itself in sufficient light weight. Also, the rear axle guide plate functions as a reinforcing member of the rear end portion, or bifurcated portion of the rear fork arms. Moreover, when the rear wheel assembly is attached to the rear fork, both end portions of the rear axle carrying the rear wheel can be placed on the lower branch portion through the rear free end portion. The projection formed on the free end portion functions as a stopper for preventing the dropping off of the rear wheel assembly.

Furthermore, according to the present invention, the drive chain tension adjusting plate can be fixed to the rear fork arms. Accordingly, when the rear axle is pulled off for detaching from the rear wheel and the rear fork arms, the drive chain tension adjusting plate does not drop off by losing its support. Accordingly, the drive chain is no more required to readjust its tension by adjusting the adjusting plate after the rear axle is reattached. Thus, prompt attaching and detaching work of the rear wheel can be obtained.

A retaining pin adapted to engage in the drive chain tension adjusting plate is made of high strength material. Because the rear fork arms are made of light alloy, the retaining pin is fixed to the rear fork arms by thread means instead of welding. In this case, the loosening of the retaining pin can be surely prevented by pressing its head with a front end portion of the rear axle guide plate.

DETAILED DESCRIPTION OF THE EMBODIMENTS

Preferred embodiments of the present invention will be described hereunder with reference to the accompanying drawings.

Figure 1:
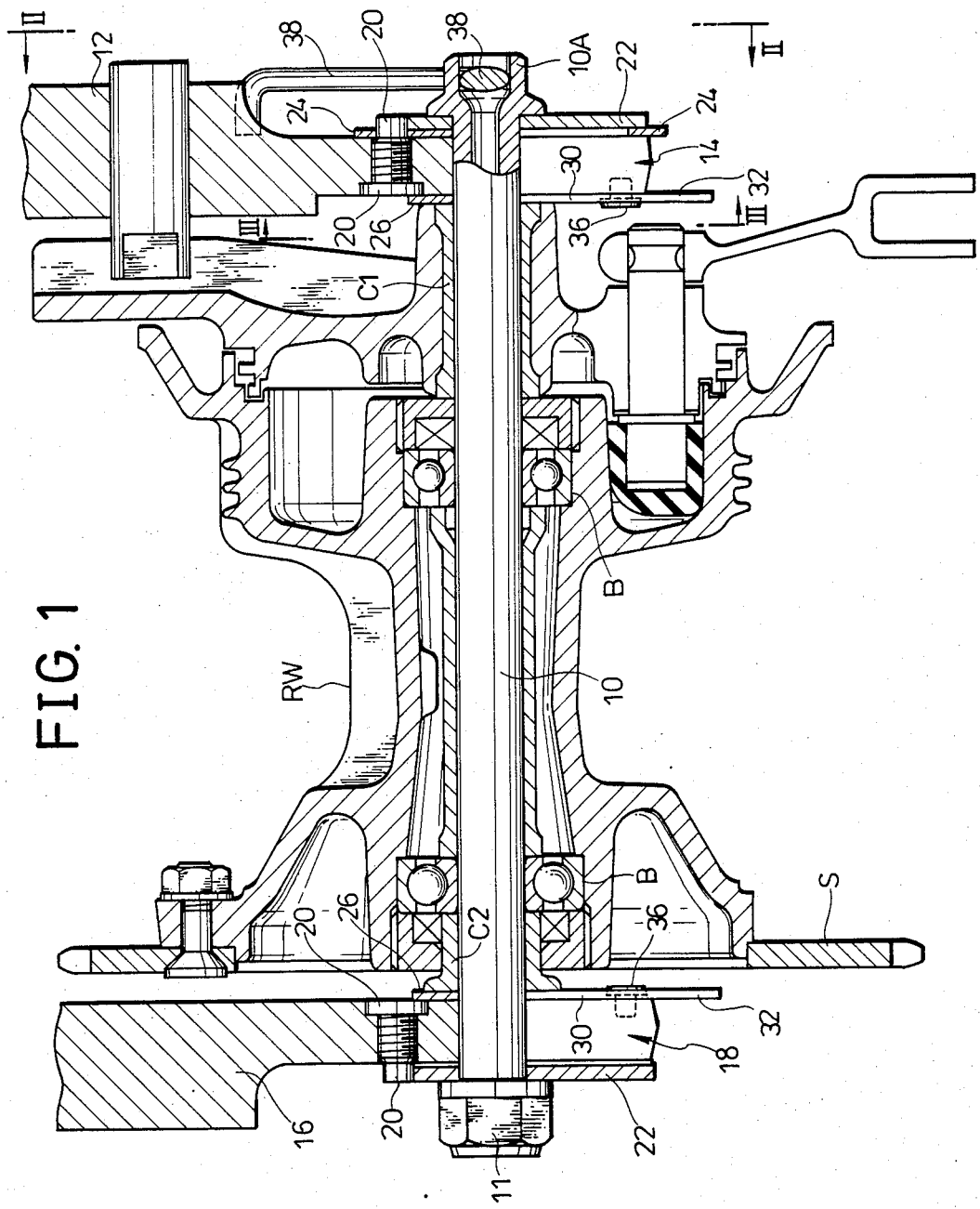
FIG. 1 is a horizontal sectional view of a rear portion of a motorcycle according to one embodiment of the present invention.

FIG. 1 is a horizontal sectional view showing a rear portion of a motorcycle according to one preferred embodiment of the present invention. A rear wheel RW (only a wheel hub thereof is shown in the figure) with a chain sprocket S fixed thereto by screw means is supported by a rear axle 10 through a pair of bearings B, B. Rear fork arms 12 and 16 made of light alloy (for example, aluminum alloy) for carrying the rear axle 10 are formed at the rear end portions thereof in a bifurcate shape. The rear axle 10 is fitted in cut-outs 14 and 18 formed in the bifurcated portion.

The rear axle 10 penetrates at both sides of the rear fork arm 12 into a drive chain tension adjusting plate (hereinafter referred to as the "adjusting plate") 22, a plate 24 for preventing detachment of the rear axle 10, and a rear axle guide plate 26. The rear axle 10 also penetrates at both sides of the other rear fork arm 16 into the adjusting plate 22 and the rear axle guide plate 26. The rear axle 10 is fastened tight by a nut 11 for fixing to the rear fork arms 12 and 16. The adjusting plate 22, the rear axle detachment preventing plate 24, and the rear axle guide plate 26 are all made of steel.

Figure 2:
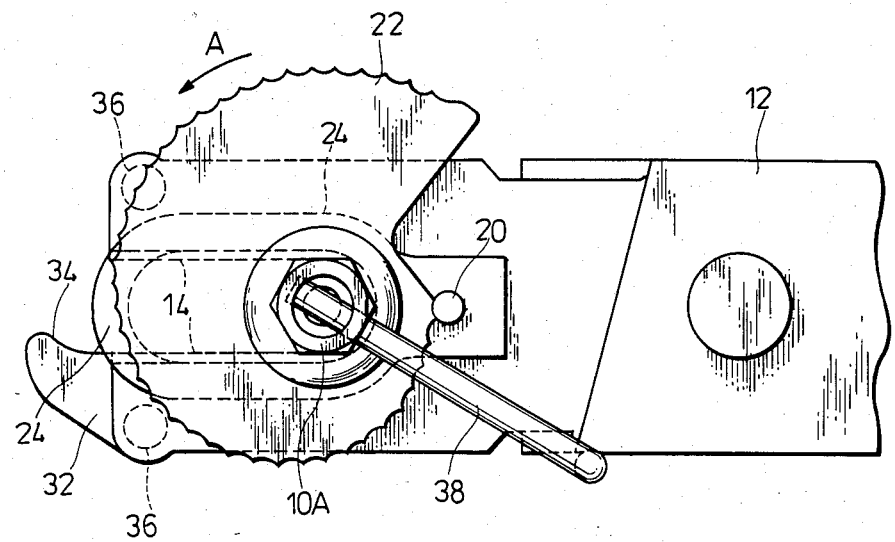
FIG. 2 is a side view when viewed from the arrows II—II of FIG. 1.

The rear fork arms 12 and 16 are threadedly fixed at front positions of the cut-outs 14 and 18 with retaining pins 20, 20. These retaining pins 20, 20 are projected from the external surfaces of the rear fork arms 12 and 16. The projected portion of the retaining pin 20 fixed to the rear fork arm 12 penetrates into a rear axle detachment preventing plate 24. The respective adjusting plates 22, 22 are urged at external peripheral portions thereof against the projected portions of the right and left retaining pins 20, 20 from backward. The external peripheral portion of the adjusting plate 22 forms a cam face having a spiral-shaped profile, as shown in FIG. 2. The cam face is continuously provided with a number of arcuate recesses suitable to fit to a cylindrical side face of the retaining pin 20. When the adjusting plate 22 is pivoted around the rear axle 10 in the direction of the arrow A, a distance between the rear axle 10 and the retaining pin 20 is increased. That is, the rear axle 10 is moved backward along the cut-out 14, and the drive chain looped around the chain sprocket S is tensioned. Accordingly, tension of the drive chain can be adjusted by setting the adjusting plate 22 in a suitable angular position. Since the right and left adjusting plates 22, 22 are formed symmetric with each other, only the right side adjusting plate 22 is shown in FIG. 2.

The rear axle detachment preventing plate 24 is, as described in the foregoing, penetrated at its front end portion by the retaining pin 20, and the remaining portion excluding the penetrated portion is formed in an oblong-shaped annular body. The rear axle detachment preventing plate 24 is provided only at the right side of the vehicle. When a nut 11 is loosened, the rear axle detachment preventing plate 24 functions as such that the right end portion of the rear axle 10 will not be detached from the rear fork arm 12. The left end portion of the rear axle 10 is brought to be close to the front side by the drive chain meshing with the chain sprocket S. Accordingly, the rear axle detachment preventing plate 24 is not required to be provided at the left side of the vehicle body.

Figure 3:
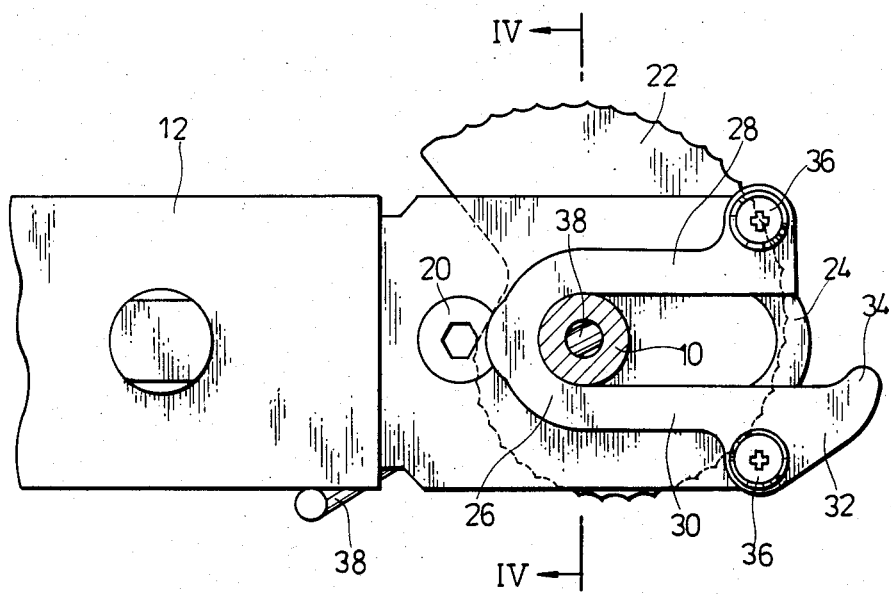
FIG. 3 is a side view when viewed from the arrows III—III of FIG. 1.
Figure 4:
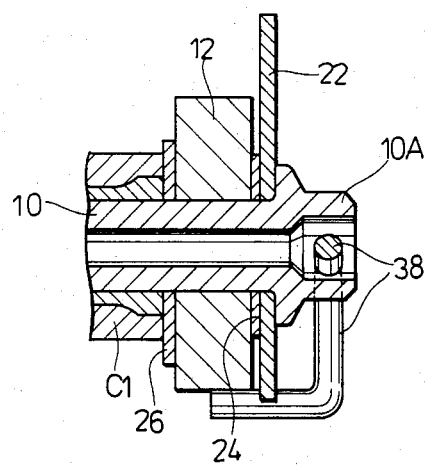
FIG. 4 is a sectional view taken along the line IV—IV of FIG. 3.

The rear axle guide plate 25 is a U-shaped body including an upper branch portion 28 and a lower branch portion 30, as shown in FIG. 3. The lower branch portion 30 is longer than the upper branch portion 28, and is formed at a free end portion of its extending portion 32 with a projection 34 projecting upward. The rear axle guide plate 26 is disposed along the internal surface of the rear fork arm 12 or 16 by a pair of screws 36. The front end portion of the rear axle guide plate 26 presses the head of the retaining pin 20.

An internal surface (a surface facing toward the center of the vehicle) of the rear axle guide plate 26 is abutted with collars C1 and C2 fitted on the rear axle 10 by pressure corresponding to the fastening axial force of the nut 11.

Accordingly, the rear axle guide plate 26 functions for supporting the rear axle 10 and protecting the internal side surfaces of the rear fork arms 12 and 16 made of aluminum alloy. It also functions as an anti-loosening member of the retaining pin 20.

Furthermore, one end portion of an L-shaped rod member 38 is in penetration engagement with a head portion 10A of the hollow rear axle 10. The other end portion of the rod member 38 is engaged with an under surface of the rear fork arm 12. This rod member 38 has such a function as to prevent rotation of the rear axle 10 at a time when the nut 11 is fastened or loosened with respect to the rear axle 10.

Since the present embodiment is such constructed as to dispose the rear axle guide plate 26 made of steel material to the rear end portions of the rear fork arms 12 and 16 made of light alloy material, the shape of the rear end portions of the rear fork arms are simple, forging thereof is easy and service life of a forging die thereof is prolonged. Besides, since the rear axle guide plate 26 is a steel plate having a thin wall, the rear fork can be made sufficiently light in weight.

Furthermore, since the rear fork arms 12 and 16 are made of light alloy, the retaining pin 20 made of steel is threadedly fixed thereto instead of welding, because it is difficult to weld light alloy, such as aluminum, to steel. However, the pin 20 is surely prevented from getting loosened by pressing the head of the retaining pin 20 with the front end portion of the rear axle guide plate 26.

Furthermore, the rear axle guide plate 25 functions as a reinforcing member of the rear end portions, or bifurcated portions of the rear fork arms 12 and 16.

Figure 5:
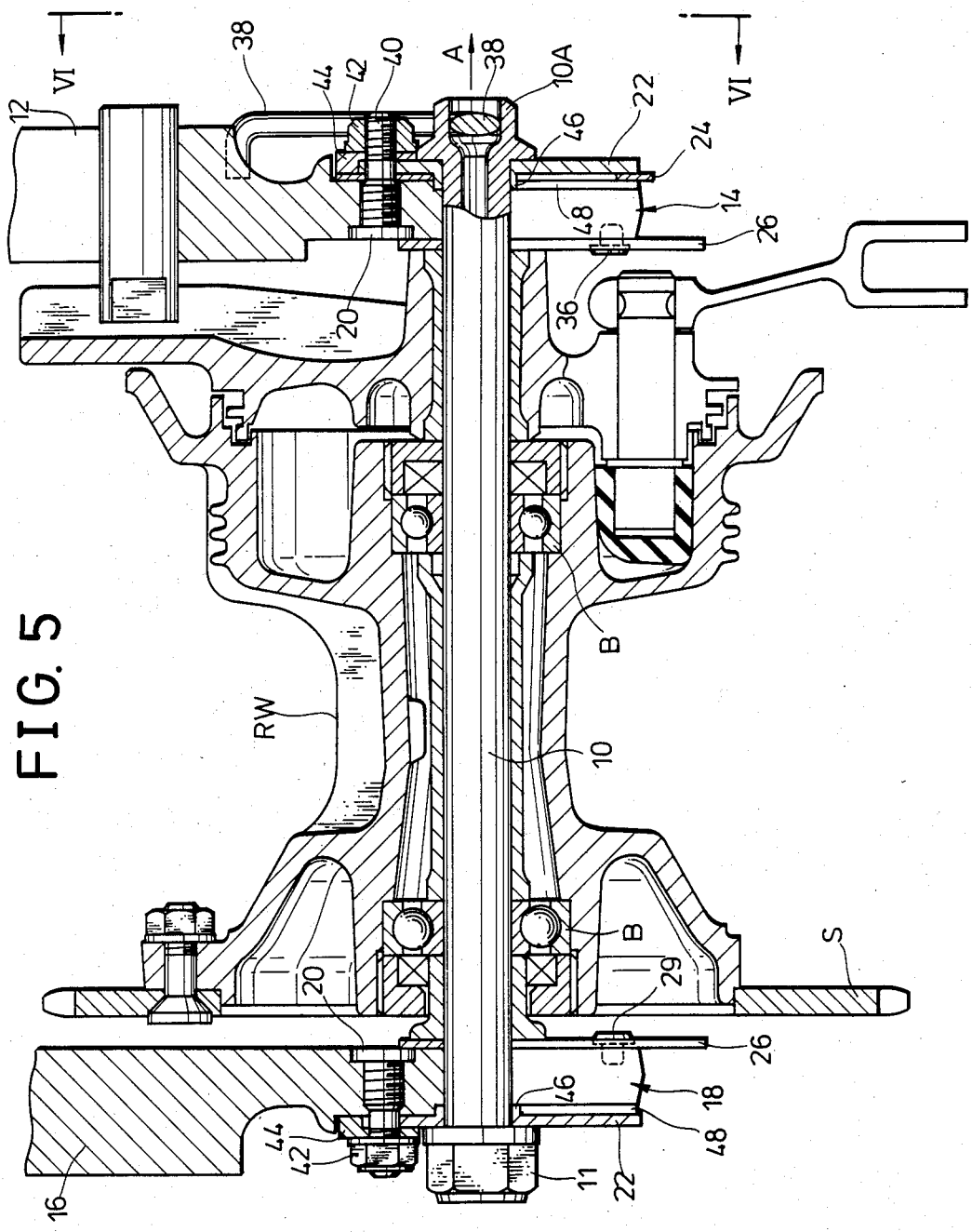
FIG. 5 is a sectional view similar to FIG. 1 of another embodiment of the present invention.
Figure 6:
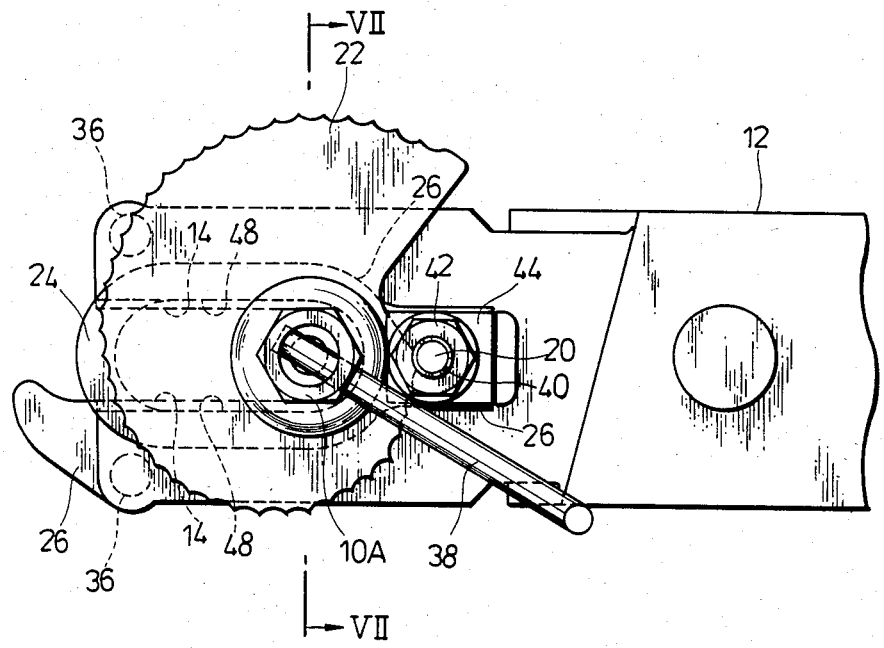
FIG. 6 is a side view when viewed from the arrows VI—VI of FIG. 5.
Figure 7:
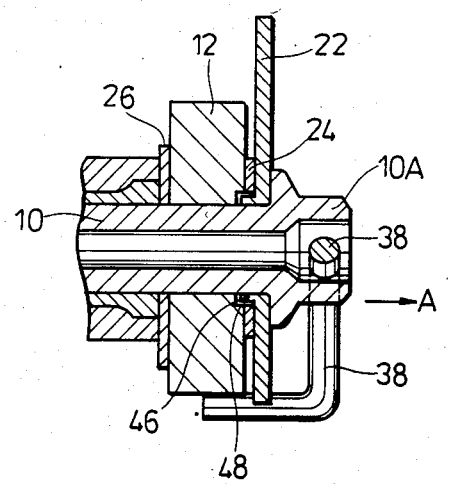
FIG. 7 is a sectional view taken along the line VI—VI of FIG. 6.

FIGS. 5 through 7 illustrate another embodiment of the present invention. In FIGS. 5 through 7, parts similar to those shown in FIGS. 1 through 4 described are denoted by similar reference numerals, and description thereof will be omitted.

In this second embodiment, a male thread 40 is formed on and end portion exceeding the portion engaging the adjusting plate 22. The male thread 40 is brought to be in threaded engagement with the nut 42. The adjusting plate 22 is pressed and held by the fastening force of the nut 42 through a presser plate 44. The rear axle detachment preventing plate 24 is also held by the fastening force of the nut 42 through the presser plate 44.

Also, the adjusting plate 22 is formed at its opening portion through which the rear axle 11 penetrates with a projection, or annular rib 46. This annular rib 46 fits in step portions 48 formed at the external side surfaces of the rear fork arms 12 and 16, respectively.

Accordingly, when the rear axle 10 is pulled off in the direction of the arrow A (FIG. 5) by loosening the nut 11 in order to detach the rear wheel RW, the adjusting plate 22 is held at its front end portion by the fastening force of the nut 42 through the presser plate 44, and the annular rib 46 engages the step portions 48 of the rear fork arms 12 and 16. Therefore, the adjusting plate 22 will not drop off by losing its support, and its adjusting position will not be changed either. Accordingly, when the rear wheel RW is reattached, the adjusting plate 22 is not required to be moved for readjustment. Thus, work efficiency is improved extensively.

What is claimed is:

1. A rear fork of a motorcycle comprising:
a pair of right and left rear fork arms made of light alloy and having rear end portions formed in a bifurcate shape respectively;
a pair of U-shaped rear axle guide plates detachably bolted along internal surfaces of said rear end portions respectively, each rear axle guide plate being made of steel and provided with an upper branch portion and a lower branch portion longer than said upper branch portion, a free end portion of said lower branch portion including a projection projecting upward therefrom,
a pair of retaining pins made of steel and threadedly fixed at front locations of said rear end portions of said rear fork arms respectively, each retaining pin having a head portion butted against said internal surface of said rear fork arm and a tip portion projecting from an external surface opposite to said internal surface, wherein said retaining pins are pressed against said rear fork arms by engagement of said head portions with said rear axle guide plates; and
a pair of drive chain tension adjusting plates pivotably supported by a rear axle and caused to engage with peripheral surfaces of said tip portions of said retaining pins by cam faces formed on outer peripheries of said adjusting plates.

2. A rear fork according to claim 1, wherein each said retaining pin has at its tip portion a male thread, and each said drive chain tension adjusting plate is pressed and held by a nut engaging with said male thread through a presser plate.

3. A rear fork according to claim 1, wherein each said drive chain tension adjusting plate includes a projection around an opening in which said rear axle penetrates, and each said projection engages a step portion formed at each said rear fork arm.

* * * * *